Aug. 16, 1932. W. F. HEINEMAN 1,872,287
METHOD OF MANUFACTURING ELECTRICALLY WELDED TUBULAR ARTICLES
Filed Dec. 22, 1928
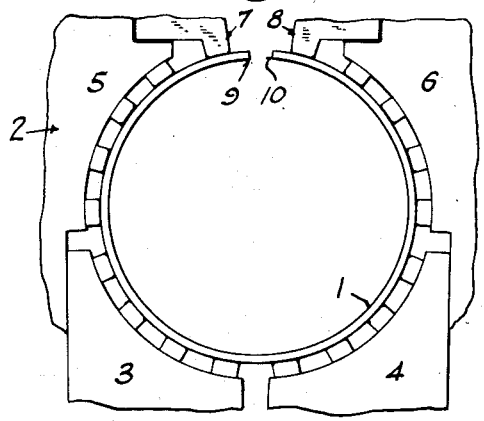
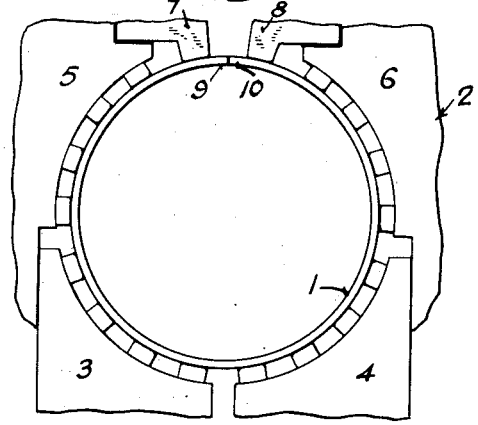
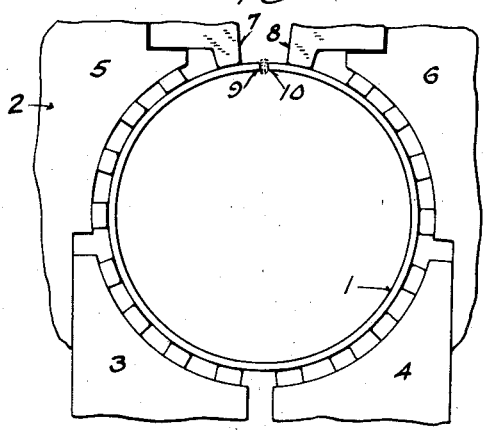
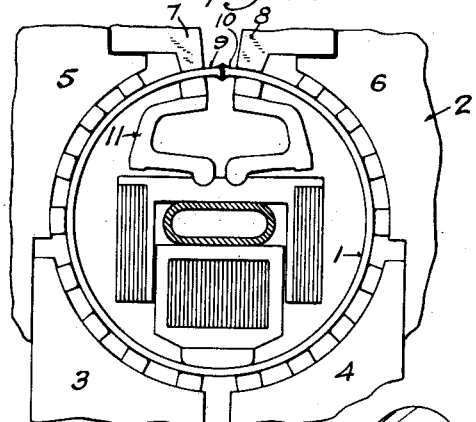
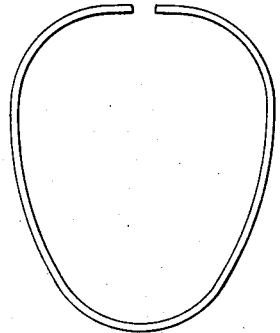
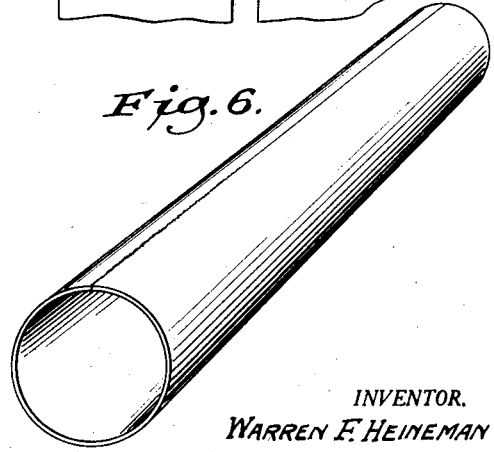
INVENTOR.
WARREN F. HEINEMAN
BY
ATTORNEY.

Patented Aug. 16, 1932

1,872,287

UNITED STATES PATENT OFFICE

WARREN F. HEINEMAN, OF SHOREWOOD, WISCONSIN, ASSIGNOR TO A. O. SMITH CORPORATION, OF MILWAUKEE, WISCONSIN, A CORPORATION OF NEW YORK

METHOD OF MANUFACTURING ELECTRICALLY WELDED TUBULAR ARTICLES

Application filed December 22, 1928. Serial No. 327,925.

This invention relates to a method of electrically welding the longitudinal seams of tubular articles, and constitutes the basis of a novel and practical method of welding such seams by means of flash welding wherein the edges of a seam are simultaneously heated throughout their common lengths by an electric arc established therebetween.

Flash welding has never been practically applied, heretofore, insofar as I have been able to ascertain, to the welding of longitudinal seams of extreme length in tubular structures. The chief reason for this lack of application is the great difficulty in obtaining a finished article of desired dimensions due to uneven or improper flashing of the metal edges. Further, an uneven or improper flashing of the metal gives the weld a non-uniform texture which is not acceptable in the market.

Through a long period of expensive experimentation, I have overcome the above and other difficulties, and to this end my present invention resides in a method wherein the edges are aligned prior to the welding operation and maintained in alignment during the entire welding period, thereby insuring a uniform simultaneous flashing of the metal throughout the length of the seam and producing a finished product of predetermined dimensions.

My method has made a great contribution to the art of welding pipe sections of extreme length since the method of flash welding applied by me has greatly increased the speed of production, reducing the welding operation to a matter of a few seconds per unit pipe section as against several minutes as was heretofore necessary.

My invention may be more readily understood by referring to the illustrations of the accompanying drawing in which the views are as follows:

Figure 1 is an enlarged end view illustrating the position of a pipe blank immediately upon its insertion into the machine.

Fig. 2 is a similar view illustrating the step of aligning and clamping the pipe.

Fig. 3 is a similar view illustrating the flashing or heating operation.

Fig. 4 is a similar view illustrating the final welding operation.

Fig. 5 is a view showing a modified form of pipe blank.

Fig. 6 is a perspective view of a finished pipe section.

The pipe blank 1 to be welded is ordinarily formed from a single piece of sheet metal which is rolled or bent into tubular form having its longitudinal edges in spaced relation for welding.

The blank is placed in a welding machine 2, between the clamping members 3, 4, 5 and 6 thereof. The clamping members 5 and 6 carry electrodes 7 and 8 which contact with the blank on opposite sides of the seam to be welded to feed the welding current thereto. The clamping members may be controlled by hydraulic or any suitable means.

When the blank is first placed in the welding machine, the edges 9 and 10 are preferably seperated by a considerable gap as shown in Fig. 1. In this position, the edges may be non-parallel and the gap between the same may be non-uniform. If the flashing arc should be established between the edges at this time, the metal where the gap is smallest would be burned and flashed off first until a uniform gap is provided and then the welding operation would continue in a uniform manner. However, the preliminary flashing off of certain portions of the edges heats the metal adjacent said portions more than is necessary, and when the final pressure is applied for welding the edges together, the edges at these portions will not integrally unite as well as the edges at the portions where the period of heating is shorter. Furthermore, the finished product will be of non-uniform and undesired diameter due to the fact that certain portions of the edges have been burned off while other portions have not, so that when the weld is made certain portions of the pipe will be of smaller diameter than other portions and the pressure applied to the different portions of the seam to effect the welding thereof will not be equal.

I overcome these difficulties by aligning the edges prior to the flashing operation so that there is substantially a uniform burning off or flashing of the metal. I preferably first press the edges together, thereby insuring a substantial parallel alignment thereof. This is preferably accomplished by causing the vertical pairs of dies 3 and 5 and 4 and 6 to move horizontally toward each other. When the edges are in abutment, the horizontal pairs of dies 3 and 4 and 5 and 6 are moved vertically toward each other to compress the pipe vertically and to bring the edges into transverse alignment. The vertical movement further securely clamps the pipe and the resiliency of the metal in some cases may be sufficient to hold the pipe in the clamps by friction during the subsequent welding operation, but, where the pipes are made of substantially thin material and are of large diameter, I prefer to use an inside mandrel 11, as illustrated in Fig. 4, of any suitable design, to securely hold the pipe section within the clamping members. I have found that where I do not employ an inside mandrel or arbor to aid in the clamping of the blank, I can obtain a more perfect clamping by employing a pipe blank of non-circular cross section, such as the one shown in Fig. 5, and that such shape of the blank will materially aid in preventing any tendency towards slipping of the blank in the clamps during the subsequent welding operation. I may use a blank of non-circular cross section together with an inside mandrel and other methods and means for facilitating the clamping of the blank may be employed. This feature is particularly important in the flash welding of pipes since the edges must be separated in order to allow an arc to be established therebetween and it is important that the pipe section be retained in the clamps without slipping in order to maintain the edges in alignment during the welding operation and to provide sufficient pressure between the electrodes and the pipe section to obtain a proper electrical contact. Thus I clamp the edges while they are pressed together and aligned, or simultaneously with the aligning operation, and I then operate the clamping members to separate the edges the desired distance for the flashing operation.

The edges to be welded are clamped in a horizontal longitudinal plane as well as in parallelism. This feature is important in the flash welding of edges of extreme length and is particularly so where the pipe blank is formed from comparatively thin flexible stock.

After the blank is properly clamped with the edges in position for welding, I apply a suitable welding current thereto and establish a flashing arc across the edges for the full length thereof.

I may apply this welding current before the edges are separated to pre-heat the same, or I may apply it substantially simultaneous with the separation of the edges to establish the flashing arc, but since these methods may be wasteful and injurious to the power supply, I prefer to separate the edges prior to the application of the current and, when the current is applied, I move the edges toward each other until an advance contact thereof establishes the flashing arc. After the flashing arc is established, I move the edges toward each other at a proper speed to maintain the arc as the metal is burned and flashed off.

When the edges have been heated to a welding temperature or after a certain predetermined amount of metal has been flashed off, I increase the speed of movement of the edges to close the gap and press the edges together, thereby integrally uniting the same throughout the total common length thereof as illustrated in Fig. 6. I may open the welding circuit either prior to the closing of the gap or subsequent thereto, although I prefer to do it substantially simultaneously therewith.

Due to the uniform burning off and flashing of the metal, no particular portion of the edges is heated for a greater period than any other portion and consequently the heat penetration along the edges will be uniform, thereby resulting in a weld having uniform qualities.

The finished product will have an accurate predetermined diameter which may be either uniform as in the case of pipe or non-uniform as in the case of certain other tubular articles. The dimensions of the finished product are dependent upon the shape and size of the original blank employed rather than upon any effect of the welding operation.

While I have illustrated in the drawing particular mechanism for clamping the pipe sections, I do not desire to limit the invention thereto as any suitable clamping mechanism may be employed, and, while I have shown a pipe formed from a single sheet of metal and having a single longitudinal seam to be welded, the present invention may be applied to any form of tubular article having one or more longitudinal seams to be welded.

In employing the word "tubular" in the specification and claims hereof, I mean to include thereby hollow articles having open ends whether the side elements of the article are parallel or non-parallel and whether the cross section thereof is circular or non-circular.

I claim:

1. The method of making an electrically welded tubular article of substantial length, which comprises forming a tubular blank having a longitudinal seam to be welded, pressing the edges of said seam together to align the same, clamping said blank to preserve the alignment of said edges during the subsequent welding operation, establishing a flashing arc between said edges for the full common length thereof to heat the same uniformly to a welding temperature, and pressing said heated edges together to effect a simultaneous welding of the same.

2. The method of making an electrically welded tubular article of substantial length, which comprises forming a tubular blank by bending a sheet of metal on longitudinal lines thereof until its side edges provide a longitudinal seam to be welded, pressing said edges together to align the same and clamping said blank to preserve the alignment of said edges during the subsequent welding operation, separating said edges while maintaining the same in alignment, establishing an arc across the gap between said edges for the full common length thereof to heat the same uniformly to a welding temperature, and then pressing said heated edges together to effect a simultaneous welding of the same.

3. The method of welding longitudinal seams in tubular articles which comprises providing a tubular blank having longitudinal edges in spaced relation, flexing the blank to align said longitudinal edges both longitudinally and transversely, thereupon clamping said edges to preserve the alignment thereof during the subsequent welding operation, closing the welding circuit while said aligned edges are in spaced relation to establish a difference in potential between said edges, moving said edges relatively toward each other to complete the welding circuit and establish and maintain a flow of welding current thereacross, said relative movement of the edges being at a rate to effect the establishment of a flashing arc between the edges and to maintain said arc during the heating of the edges to welding temperature, and thereafter pressing said heated edges together to effect a weld.

4. The method of manufacturing tubular articles of substantial length comprising forming a tubular blank from a flat metal sheet with the side edges of the sheet providing a longitudinal seam to be welded, initially applying pressure to said edges to bring the same into longitudinal and transverse alignment, thereupon clamping said edges, establishing a flashing arc substantially simultaneously at all points along the seam while maintaining said edges in alignment, and finally applying welding pressure to said edges.

5. The method of electric flash welding sheet metal edges of substantial length which comprises initially pressing said edges together to bring the same into longitudinal and transverse alignment, thereafter clamping said edges to preserve the alignment thereof, and then proceeding with the welding operation in which the flashing arc is established and maintained between the edges to heat the same to welding temperature, and then a welding pressure is applied to complete the weld.

6. The method of flash welding the longitudinal seam of a tubular article which comprises applying pressure members loosely to the article, moving said pressure members relatively toward one another to thereby flex the side walls of the article while the same are allowed to slip in the pressure members to force the edges to be welded into longitudinal and transverse alignment and until the blank is securely held by the pressure members with the edges in alignment, establishing a flashing arc throughout the length of the edges to heat the edges simultaneously to a welding temperature, and thereafter applying pressure to the blank by means of said pressure members to press the edges together and weld the same.

7. The method of flash welding the longitudinal seam of a tubular article which comprises applying pressure to the article in a transverse direction to effect a closing of the edges in abutting relation and a substantially continuous contact of the same throughout their common length, then applying pressure to the blank in a direction perpendicular to the last named pressure to bring the opposing edge portions into accurate transverse alignment, and thereafter maintaining said edges in alignment and establishing a flashing arc throughout the length of the edges, and finally pressing the edges together to weld the same.

In testimony whereof, I have signed my name at Milwaukee, Wisconsin, this 20th day of December, 1928.

WARREN F. HEINEMAN.